United States Patent
Funakoshi et al.

(10) Patent No.: US 10,247,571 B2
(45) Date of Patent: Apr. 2, 2019

(54) REMINDER NOTIFICATION SYSTEM AND REMINDER NOTIFICATION METHOD

(71) Applicant: HONDA MOTOR CO., LTD., Tokyo (JP)

(72) Inventors: Kotaro Funakoshi, Wako (JP); Mikio Nakano, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 196 days.

(21) Appl. No.: 15/240,027

(22) Filed: Aug. 18, 2016

(65) Prior Publication Data
US 2017/0089719 A1    Mar. 30, 2017

(30) Foreign Application Priority Data
Sep. 29, 2015   (JP) .................................. 2015-192281

(51) Int. Cl.
*G01C 21/00* (2006.01)
*G01C 21/36* (2006.01)
*G01C 21/20* (2006.01)

(52) U.S. Cl.
CPC ......... *G01C 21/3679* (2013.01); *G01C 21/20* (2013.01); *G01C 21/3664* (2013.01)

(58) Field of Classification Search
CPC . G01C 21/20; G01C 21/3664; G01C 21/3679
See application file for complete search history.

(56) References Cited

U.S. PATENT DOCUMENTS

| 5,543,789 | A  | * | 8/1996  | Behr    | G01C 21/26 340/990     |
| 6,321,158 | B1 | * | 11/2001 | DeLorme | G01C 21/26 340/995.16  |
| 7,239,960 | B2 | * | 7/2007  | Yokota  | G01C 21/3476 340/995.19|
| 7,743,056 | B2 | * | 6/2010  | Meisels | G06F 17/30241 707/731  |

(Continued)

FOREIGN PATENT DOCUMENTS

| JP | 09-196693 A   | 7/1997 |
| JP | 2003-022085 A | 1/2003 |

(Continued)

OTHER PUBLICATIONS

Japanese Office Action with English Translation dated Dec. 4, 2018, 7 pages.

*Primary Examiner* — Khoi H Tran
*Assistant Examiner* — Jorge O Peche
(74) *Attorney, Agent, or Firm* — Rankin, Hill & Clark LLP

(57) ABSTRACT

A reminder notification system includes: a position acquisition unit configured to acquire a position of a user; a target position setting unit configured to set a target position; and a reminder notification unit configured to provide a reminder about a proximity area close to the target position set in the target position setting unit when the position of the user is in the proximity area, wherein the target position setting unit sets the target position associated with a predetermined category, and wherein the reminder notification unit provides the reminder when the position of the user arrives at at least one proximity area of a plurality of the target positions belonging to the predetermined category.

6 Claims, 7 Drawing Sheets

(56) References Cited

U.S. PATENT DOCUMENTS

| | | | | |
|---|---|---|---|---|
| 8,239,130 | B1* | 8/2012 | Upstill | G01C 21/3679 701/400 |
| 8,433,512 | B1* | 4/2013 | Lopatenko | G01C 21/3679 701/400 |
| 8,467,959 | B2* | 6/2013 | Nesbitt | G01C 21/00 701/410 |
| 8,566,029 | B1* | 10/2013 | Lopatenko | G08G 1/0962 701/426 |
| 8,589,069 | B1* | 11/2013 | Lehman | G01C 21/20 340/995.1 |
| 9,141,582 | B1* | 9/2015 | Brinkmann | G06F 17/00 |
| 9,204,251 | B1* | 12/2015 | Mendelson | G08G 1/14 |
| 9,488,488 | B2* | 11/2016 | Waldman | G01C 21/3602 |
| 9,538,332 | B1* | 1/2017 | Mendelson | H04W 4/90 |
| 9,674,684 | B1* | 6/2017 | Mendelson | H04W 4/90 |
| 9,772,193 | B1* | 9/2017 | Mendelson | H04W 4/90 |
| 9,961,507 | B1* | 5/2018 | Mendelson | H04W 4/90 |
| 2003/0036848 | A1* | 2/2003 | Sheha | G01C 21/3679 701/468 |
| 2003/0158658 | A1 | 8/2003 | Hoever et al. | |
| 2004/0204821 | A1* | 10/2004 | Tu | G01C 21/3679 701/527 |
| 2004/0254723 | A1* | 12/2004 | Tu | G01C 21/3679 701/410 |
| 2004/0260465 | A1* | 12/2004 | Tu | G01C 21/3679 701/426 |
| 2005/0165543 | A1* | 7/2005 | Yokota | G01C 21/3679 701/465 |
| 2006/0089788 | A1* | 4/2006 | Laverty | G01C 21/3679 701/426 |
| 2006/0253247 | A1* | 11/2006 | de Silva | G01C 21/3611 701/426 |
| 2006/0265422 | A1* | 11/2006 | Ando | G01C 21/3679 |
| 2007/0219706 | A1* | 9/2007 | Sheynblat | G01C 21/3679 701/532 |
| 2009/0037101 | A1* | 2/2009 | Koike | G01C 21/3664 701/533 |
| 2009/0265251 | A1* | 10/2009 | Dunlap | G06Q 10/087 705/26.1 |
| 2010/0026526 | A1* | 2/2010 | Yokota | G08G 1/096827 340/996 |
| 2010/0248746 | A1* | 9/2010 | Saavedra | G01C 21/3407 455/456.3 |
| 2010/0305842 | A1* | 12/2010 | Feng | G01C 21/3679 701/533 |
| 2011/0167058 | A1* | 7/2011 | van Os | G06F 17/3087 707/722 |
| 2011/0238301 | A1* | 9/2011 | Lee | G01C 21/20 701/408 |
| 2012/0197696 | A1* | 8/2012 | Beyeler | G01C 21/3682 705/14.4 |
| 2013/0166586 | A1* | 6/2013 | Pfeifle | G01C 21/32 707/769 |
| 2013/0217332 | A1* | 8/2013 | Altman | H04H 60/90 455/41.2 |
| 2013/0217333 | A1* | 8/2013 | Sprigg | G06Q 30/0207 455/41.2 |
| 2013/0268446 | A1* | 10/2013 | Buschmann | G06Q 30/01 705/304 |
| 2014/0032101 | A1* | 1/2014 | Pandya | G06F 17/30241 701/454 |
| 2014/0133656 | A1* | 5/2014 | Wurster | H04L 9/0637 380/270 |
| 2014/0350844 | A1* | 11/2014 | Chen | H04L 67/02 701/426 |
| 2015/0187107 | A1* | 7/2015 | Vander Mey | G06Q 30/00 345/629 |
| 2015/0300837 | A1* | 10/2015 | Hisano | G06Q 30/0266 701/454 |
| 2016/0061617 | A1* | 3/2016 | Duggan | G01C 21/3679 701/538 |
| 2016/0069699 | A1* | 3/2016 | Chen | G01C 21/3605 701/426 |
| 2016/0302030 | A1* | 10/2016 | White | H04W 4/02 |
| 2016/0314633 | A1* | 10/2016 | Bonanni | G07C 9/00111 |
| 2017/0067748 | A1* | 3/2017 | Glover | G01C 21/20 |
| 2017/0299399 | A1* | 10/2017 | Yamaguchi | G06F 17/30 |
| 2017/0339513 | A1* | 11/2017 | Zhou | H04M 1/7253 |

FOREIGN PATENT DOCUMENTS

| | | | |
|---|---|---|---|
| JP | 2004-517332 A | | 6/2004 |
| JP | 2006-023793 | | 1/2006 |
| JP | 2006023793 A | * | 1/2006 |
| JP | 2011-099694 A | | 5/2011 |
| WO | 2011/111275 A1 | | 9/2011 |

* cited by examiner

FIG. 3

POI INFORMATION DB

| CATEGORY | ADDRESS OF TARGET POSITION |
|---|---|
| CONVENIENCE STORE A | ・・・ SHINAGAWA-KU, TOKYO<br>・・・ SHINJUKU-KU, TOKYO<br>・・・ TOTSUKA-KU, YOKOHAMA-SHI, KANAGAWA<br>⋮ |
| CONVENIENCE STORE B | ・・・ KITA-KU, TOKYO<br>・・・ NERIMA-KU, TOKYO<br>・・・ SAIWAI-KU, KAWASAKI-SHI, KANAGAWA<br>⋮ |
| SUPERMARKET A | ・・・ SETAGAYA-KU, TOKYO<br>・・・ NAKANO-KU, TOKYO<br>・・・ CHIGASAKI-SHI, KAWASAKI<br>⋮ |
| DRUGSTORE A | ・・・ KOTO-KU, TOKYO<br>・・・ CHIYODA-KU, TOKYO<br>・・・ MIDORI-KU, YOKOHAMA-SHI, KANAGAWA<br>⋮ |

⋮

REMINDER NOTIFICATION SYSTEM AND REMINDER NOTIFICATION METHOD

CROSS-REFERENCE TO RELATED APPLICATION

Priority is claimed on Japanese Patent Application No. 2015-192281, filed Sep. 29, 2015, the content of which is incorporated herein by reference.

BACKGROUND OF THE INVENTION

Field of the Invention

The present invention relates to a reminder notification system and a reminder notification method.

Description of Related Art

An information processing device is known that provides a user with a reminder when the user arrives at a target position (for example, refer to Japanese Unexamined Patent Application, First Publication No. 2006-23793 (hereinafter referred to as Patent Literature 1)). The information processing device includes a device configured to acquire position information, for example, a Global Positioning System (GPS), and provides a reminder when a position acquired by the GPS is close to or approaches a preset target position. The reminder means to notify the user of arrival at the target position by a transmission technique using, for example, an image, a voice, and a vibration.

SUMMARY OF THE INVENTION

However, in the information processing device disclosed in Patent Literature 1, the reminder is provided to the user when he or she arrives at a preset target position, but it is necessary to individually register the target position. Therefore, when there is a plurality of target positions, the user must set the target positions individually. For example, when paying utility charge, any of facilities such as a bank, a post office, and a convenience store can be served as the target position. In this case, when such facilities are set as the target positions, there is a problem in which setting consumes time and effort.

In view of the above-described problems, aspects according to the present invention provide a reminder notification system and a reminder notification method through which it is possible to reduce time and effort necessary for individually registering target positions.

In order to achieve the above objects, the present invention employs the following aspects.

(1) A reminder notification system according to an aspect of the present invention includes a position acquisition unit configured to acquire a position of a user; a target position setting unit configured to set a target position; and a reminder notification unit configured to provide a reminder about a proximity area close to the target position set in the target position setting unit when the position of the user is in the proximity area. The target position setting unit sets the target position associated with a predetermined category. The reminder notification unit provides the reminder when the position of the user arrives at at least one proximity area of a plurality of the target positions belonging to the predetermined category.

(2) In the above aspect (1), the reminder notification system may further include a search unit configured to search for the target position within a predetermined search range; and a target position information notification unit configured to notify of target position information about the target position within the search range found in the search unit.

(3) In the above aspect (2), the search unit may update a target position list that is a list of target positions belonging to a category according to a movement of the position acquisition unit.

(4) In the above aspect (2) or (3), the reminder notification system may further include a calculation unit configured to calculate a most quick-arrival target position which is a target position at which the user most quickly arrives when a plurality of the target positions are found within the search range. The target position information notification unit may notify of most quick-arrival target position information about the most quick-arrival target position.

(5) In any one of the above aspects (1) to (4), the reminder notification system may further include a confirmation detection unit configured to detect confirmation of notification of the reminder by the user.

(6) In any one of the above aspects (1) to (5), the reminder notification system may further include a sound collection unit configured to record an acoustic signal; and a voice recognition unit configured to recognize the acoustic signal collected by the sound collection unit. The target position setting unit may set the target position on the basis of the acoustic signal recognized by the voice recognition unit.

(7) In the above aspect (5), the reminder notification system may further include a sound collection unit configured to record an acoustic signal; and a voice recognition unit configured to recognize the acoustic signal collected by the sound collection unit. The confirmation detection unit may detect confirmation of notification of the reminder on the basis of the acoustic signal recognized by the voice recognition unit.

(8) A reminder notification method according to an aspect of the present invention includes a position acquisition procedure of acquiring a position of a user; a target position setting procedure of setting a target position; a reminder notification procedure of providing a reminder about a proximity area close to the target position set in the target position setting procedure when the position of the user is in the proximity area. The target position associated with a predetermined category is set in the target position setting procedure. The reminder is provided when the position of the user arrives at at least one proximity area of a plurality of the target positions belonging to the predetermined category in the reminder notification procedure.

According to the above-described aspects of (1) and (8), since a target position associated with a predetermined category is set, it is possible to set a plurality of target positions by deciding the predetermined category. In addition, the reminder is provided when the user arrives at at least one proximity area among the plurality of target positions. Accordingly, it is possible to reduce the time and effort necessary for individually registering the plurality of target positions.

In the above-described (2), it is possible to limit the number of target positions to be set. Therefore, it is possible to contribute to the reduction of an amount of computation.

In the above-described (3), since the target position list is updated according to the movement of the user, it is possible to update a close target position at any time.

In the above-described (4), it is possible to provide a target position at which the user most easily arrives.

In the above-described (5), it is possible to confirm the arrival of the user at the target position.

In the above-described (6), since the target position can be set by a voice input, it is possible to easily set the target position.

In the above-described (7), since arrival of the user at the target position can be confirmed by a voice input, it is possible to easily confirm the arrival at the target position.

BRIEF DESCRIPTION OF THE DRAWINGS

FIG. 3 is a diagram showing an example of POI information data.

DETAILED DESCRIPTION OF THE INVENTION

First, an overview of an embodiment of the present invention will be described.

A reminder notification system of the present embodiment includes, for example, a portable terminal such as a smart phone or a tablet that is possessed by a user and a server. Information about a target position is input from the portable terminal and a reminder is provided when the user is close to the target position. The target position is classified into a predetermined category. By deciding the category, it is possible to set a plurality of target positions belonging to the category.

Hereinafter, an embodiment of the present invention will be described with reference to the drawings.

Figure 1:
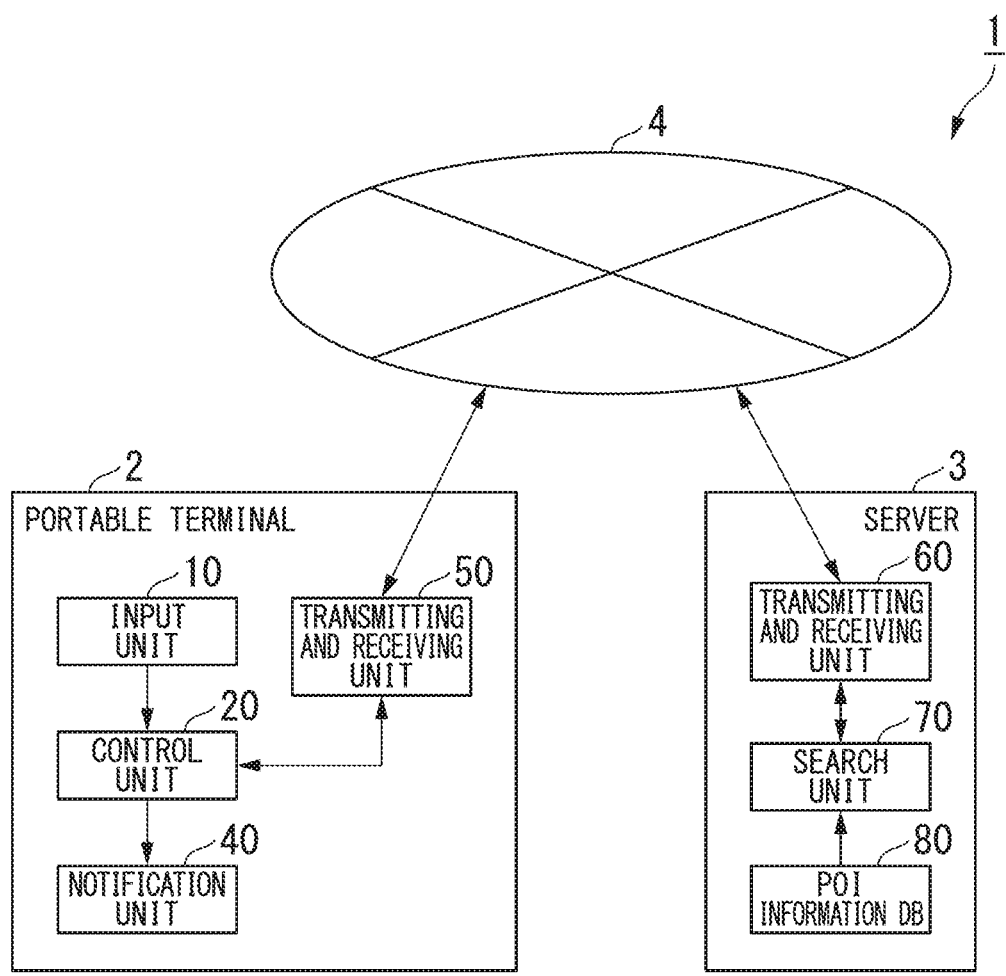
FIG. 1 is a block diagram showing a configuration of a reminder notification system according to an embodiment.
Figure 2:
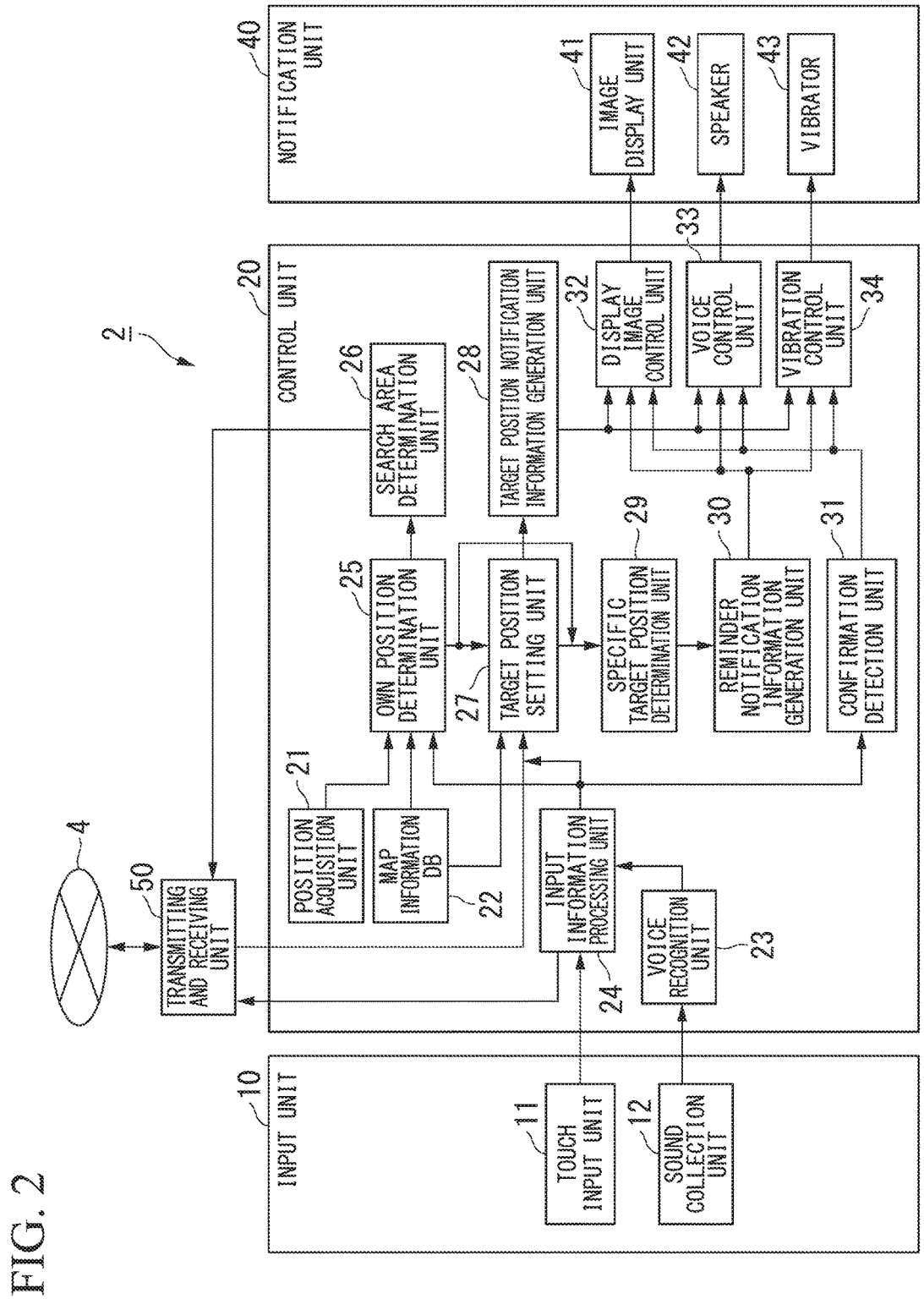
FIG. 2 is a block diagram showing a configuration of a portable terminal.

FIG. 1 is a block diagram showing a configuration of a reminder notification system according to an embodiment of the present invention. FIG. 2 is a block diagram showing a configuration of a portable terminal 2. As shown in FIG. 1, a reminder notification system 1 includes the portable terminal 2 and a server 3. The portable terminal 2 and the server 3 are communicatively connected to each other via a network 4.

The user possesses the portable terminal 2. The server 3 is provided at the outside of the portable terminal 2 such as at a base station or a cloud. The portable terminal 2 includes an input unit 10, a control unit 20, a notification unit 40, and a transmitting and receiving unit 50. The server 3 includes a transmitting and receiving unit 60, a search unit 70, and point of interest (POI) information database (DB) 80.

<Server 3>

First, the server 3 will be described. The transmitting and receiving unit 60 in the server 3 transmits and receives various pieces of information to and from the transmitting and receiving unit 50 in the portable terminal 2 via the network 4. A plurality of pieces of POI information data is stored in the POI information DB 80. POI information is stored in advance in the POI information DB 80. The POI information is fixed information. However, the POI information stored in the POI information DB 80 may be, for example, updated according to a movement of the user. As the POI information, as shown in FIG. 3, addresses of target positions classified into categories are stored. FIG. 3 is a diagram showing an example of the POI information data. In the example shown in FIG. 3, the category is determined according to a type of a store. Specifically, the POI information is classified into categories of a convenience store A, a convenience store B, a supermarket A, and a drugstore A. For example, addresses as the POI information of the convenience store A belong to the category of the convenience store A.

In the POI information DB 80, a plurality of addresses of stores belonging to the category is stored as addresses of target positions.

The category for classifying the POI information is determined in various forms. The category for classifying the POI information includes a store size, a type and a quantity of goods to be sold, a type of a service to be provided, characteristics of a customer and business hours in addition to the type of the store. A combination of POI information classified into such categories may be stored in the POI information DB 80.

For example, the goods to be sold include various goods such as vegetables, an alcoholic beverage, and a book. Among them, addresses included in the convenience store A, the convenience store B, and the supermarket A may be stored as POI information of a store in which vegetables are sold. In addition, types of stores in which the goods are sold may be classified into categories and stored in the POI information DB 80. For example, vegetables that are sold in stores such as a convenience store and a supermarket may be stored. That is, "vegetables are sold" is a category above the category of the store such as "convenience store" and "supermarket." In this manner, the categories may be hierarchized.

For example, when "convenience store" is decided as the category, the POI information belonging to categories of the convenience store A and the convenience store B serves as information of the target position. In addition, when "buy vegetables" is decided as the category, the POI information belonging to categories of the convenience store A, the convenience store B, and the supermarket A belonging to categories of "convenience store" and "supermarket" serves as information of the target position. The server 3 in which the POI information DB 80 is provided transmits and receives information to and from a terminal other than the portable terminal 2 possessed by the user, and also exchanges information with a device other than the portable terminal. Therefore, since the POI information DB 80 is provided in the server 3, it can provide more opportunities of information collection than when it is provided in the portable terminal 2. Accordingly, it is possible to easily update the POI information.

When input information and search area information transmitted from the portable terminal 2 are received, the search unit 70 searches the POI information DB for the POI information belonging to the category based on the input information within a search area based on the search area information. The search unit 70 outputs the found POI information within the search area to the transmitting and receiving unit 60. The transmitting and receiving unit 60 transmits the POI information within the search area output from the search unit 70 to the portable terminal 2.

The search unit 70 and the POI information DB 80 can also be provided in the portable terminal 2 rather than in the server 3. In this case, the server 3 in the reminder notification system 1 is unnecessary, and the transmitting and receiving unit 50 in the portable terminal 2 is also unnecessary.

However, an amount of information to be stored in the POI information DB 80 increases. Therefore, a form in which the POI information is stored in the server 3 at the outside of the portable terminal 2 is suitable.

<Portable Terminal 2>

Next, the portable terminal 2 will be described. As shown in FIG. 2, the input unit 10 in the portable terminal 2 includes a touch input unit 11 and a sound collection unit 12. The control unit 20 includes a position acquisition unit 21, a map information DB 22, a voice recognition unit 23, an input information processing unit 24, an own position determination unit 25, a search area determination unit 26, a target position setting unit 27, a target position notification information generation unit 28, a specific target position determination unit 29, a reminder notification information generation unit 30, a confirmation detection unit 31, a display image control unit 32, a voice control unit 33, and a vibration control unit 34. The notification unit 40 includes an image display unit 41, a speaker 42, and a vibrator 43.

The touch input unit 11 includes a touch panel provided in a screen of the portable terminal 2.

The touch input unit 11 performs detection on a screen on which an icon corresponding to a predetermined object is displayed and a touch input by a user on the screen. The touch input unit 11 detects input information that is input, by a user, by touching an icon displayed on the screen. The touch input unit 11 outputs the detected input information to the input information processing unit 24. In addition, a text input screen (for example, a keyboard) is displayed on the touch input unit 11 and the user may input desired content using the text input screen by finger manipulation.

An icon corresponding to the category of the POI information is displayed on the touch input unit 11. For example, icons of products such as vegetables, an alcoholic beverage and a book are displayed on the touch input unit 11. When such an icon is manipulated in the touch input unit 11, buying a product corresponding to the manipulated icon is requested by the user.

In addition, the icon displayed on the touch input unit 11 includes an icon corresponding to a predetermined store and an icon corresponding to the provision of a service such as utility charge payment. When such an icon is manipulated in the touch input unit 11, visiting a store corresponding to the manipulated icon and the provision of the service are requested by the user.

The sound collection unit 12 includes a microphone provided in the portable terminal 2. The sound collection unit 12 records a voice signal produced by a user or the like. The sound collection unit 12 converts the acquired voice signal from an analog signal to a digital signal, and outputs the converted voice signal to the voice recognition unit 23 in the control unit 20. The voice signal includes, for example, information for setting a target position and information indicating arrival at the target position. The sound collection unit 12 may use a close-talking microphone or use a microphone array in which a plurality of microphones is included. When the microphone array is used, it is possible to increase voice recognition accuracy in a noisy environment using, for example, an algorithm such as well-known delay-and-sum beamforming.

The sound collection unit 12 records a voice signal based on an utterance of the user. For example, a voice signal based on the utterance "I want vegetables" of the user is recorded in the sound collection unit 12. Therefore, the user performs input more easily by an input by the sound collection unit 12 than an input by manipulating an icon displayed on the touch input unit 11.

The position acquisition unit 21 in the control unit 20 is a Global Positioning System (GPS) and acquires position information of a current location of the portable terminal 2. The position acquisition unit 21 outputs the acquired position information of the current location to the own position determination unit 25. In addition, the position acquisition unit 21 may acquire position information of a current location from a base station of the portable terminal or the like.

The map information DB 22 stores a range of activity of a user, for example, Japan map information. When the own position determination unit 25 reads map information, the map information DB 22 outputs the stored map information to the own position determination unit 25. When the target position setting unit 27 reads the map information, the map information DB 22 outputs the stored map information to the target position setting unit 27.

The voice recognition unit 23 recognizes the voice signal collected by the sound collection unit 12, understands intention, and generates input information based on the user's voice. For example, when the voice signal is recognized based on the utterance of "I want vegetables," input information corresponding to "buy vegetables" is generated as the input information. The voice recognition unit 23 outputs the generated input information to the input information processing unit 24. Here, the voice recognition unit 23 is operated using a well-known voice recognition technique such as a hidden Markov model (HMM) and N-gram. While an example in which the voice recognition unit 23 is operated in the portable terminal has been described in the present embodiment, the voice recognition unit 23 may perform only a function of inputting a voice, the input voice signal is transmitted to a server side (not shown), and the server may perform voice recognition. In addition, the voice recognition unit 23 uses a conceptual model stored in its own unit, and understands the intention of utterance content by a well-known method. The conceptual model is a model in which a rule or a method used for semantic understanding is described.

The input information processing unit 24 generates target position input information, arrival confirmation information, or target position cancel information on the basis of input information output from the touch input unit 11 or input information output from the voice recognition unit 23. The input information processing unit 24 outputs the generated target position input information to the own position determination unit 25 and the transmitting and receiving unit 50. The input information processing unit 24 outputs the generated arrival confirmation information and target position cancel information to the confirmation detection unit 31. The input information processing unit 24 outputs the generated target position input information to the target position setting unit 27. In addition, the target position cancel information is information for removing the target position input information.

The own position determination unit 25 reads map information of the surroundings of the current position from the map information DB 22 on the basis of the position information of the current location output from the position acquisition unit 21 when the target position input information is output from the input information processing unit 24. The own position determination unit 25 determines an own position of a user and generates own position information on the basis of the position information of the current location and the map information read from the map information DB 22. The own position determination unit 25 outputs the generated own position information about the own position to the search area determination unit 26, the target position setting unit 27, and the specific target position determination unit 29.

The search area determination unit 26 determines a search area in which a target position is searched for on the basis of the own position information output from the own position determination unit 25. The search area determination unit 26 outputs the search area information about the determined search area to the transmitting and receiving unit 50. The search area may be, for example, an area within a predetermined range in the surroundings of the user. For example, an area within a radius of 500 m or 1 km in the surroundings of the user may be the search area.

In addition, the search area may be appropriately decided according to the user's state. The user's state may be determined by a movement method that the user uses. For example, when the user moves on foot or moves using a motor vehicle, a case in which the user moves on foot may have a narrower search area than a case in which the user moves using a motor vehicle. In addition, when the user moves using a streetcar, the search area may be set according to a traveling direction of the streetcar. In addition, when the user drives a motor vehicle on a freeway, the search area may be set as the vicinity of an exit of the freeway.

When the POI information within the search area that is transmitted from the server 3 via the network 4 and received by the transmitting and receiving unit 50 is acquired, the target position setting unit 27 reads the map information from the map information DB 22. The target position setting unit 27 creates a list of target positions (hereinafter referred to as a "target position list") on the basis of the read map information, the acquired POI information, and the target position input information output from the input information processing unit 24, and sets target positions included in the target position list. Information of the target positions (hereinafter referred to as "target position information") included in the target position list created in the target position setting unit 27 and set in the target position setting unit 27 may be singular or plural.

The target position setting unit 27 calculates a specific target position on the basis of the set target position information and the own position information output from the own position determination unit 25. The target position setting unit 27 calculates a target position at which the user arrives most quickly as the specific target position. The specific target position is decided from among target positions included in the target position list. When there is a plurality of target positions, the specific target position is a target position at which the user arrives most quickly. In the present embodiment, the specific target position is a target position that is closest to the user among target positions. However, the specific target position may be calculated in other manners. For example, when the user moves using a vehicle, between a target position at which the user can arrive quickly using a highway and a target position at which the user is unable to arrive quickly even when a highway is used, a case of the target position at which the user can arrive quickly using a highway can be set as the specific target position. The target position setting unit 27 outputs the set target position information and the specific target position information about the calculated specific target position to the target position notification information generation unit 28 and the specific target position determination unit 29 together with the map information.

The target position setting unit 27 calculates a shortest path from the own position to the specific target position by searching the map information DB and using a well-known method on the basis of the own position on the map and the calculated specific target position. The target position setting unit 27 outputs shortest path information about the calculated shortest path that is added to the target position information to the target position notification information generation unit 28 and the specific target position determination unit 29.

The target position notification information generation unit 28 generates target position notification information for notifying of the target position and specific target position notification information for notifying of the specific target position on the basis of the target position information, the specific target position information and the map information output from the target position setting unit 27. In addition, the target position notification information generation unit 28 generates notification information of a shortest path to a specific target position on the basis of the shortest path information output from the target position setting unit 27. The target position notification information generation unit 28 outputs the generated target position notification information, the specific target position notification information, and the shortest path information to the display image control unit 32, the voice control unit 33, and the vibration control unit 34.

The specific target position determination unit 29 determines whether the user enters a proximity area of the specific target position on the basis of the specific target position output from the target position setting unit 27 and the own position information output from the own position determination unit 25. The proximity area of the specific target position is set to a range at which a specific target position is within the view of the user who possesses the portable terminal 2, for example, within a radius of 10 m, a radius of 30 m, radius of 50 m of the user who possesses the portable terminal 2. However, the proximity area of the specific target position may also be set to another range. When the user enters the proximity area of the specific target position, the specific target position determination unit 29 outputs specific target position approach information to the reminder notification information generation unit 30.

The specific target position determination unit 29 determines whether the user arrives at the specific target position on the basis of the specific target position and the own position information. Determination of whether the user arrives at the specific target position is performed according to whether the own position of the user matches the specific target position or whether the user enters a predetermined range. The predetermined range is, for example, a range within a radius of 3 m. When it is determined that the user arrives at the specific target position, the specific target position determination unit 29 generates specific target position arrival information and outputs the generated information to the reminder notification information generation unit 30.

When it is determined that the user arrives at the specific target position, the specific target position determination unit 29 sets a confirmation timer. The confirmation timer is a timer of counting down or counting up an arrival confirmation time, which is a time until the user confirms the arrival at the specific target position, for example, 30 seconds. The arrival confirmation time may be another time.

The reminder notification information generation unit 30 generates approach notification information when the specific target position approach information is output from the specific target position determination unit 29. The reminder notification information generation unit 30 generates arrival notification information when the specific target position arrival information is output from the specific target position determination unit 29. The reminder notification information generation unit 30 outputs the generated approach notification information and arrival notification information to the display image control unit 32, the voice control unit 33, and the vibration control unit 34. Both the approach notification information and the arrival notification information are referred to as reminder notification information.

When the arrival confirmation information is output from the input information processing unit 24, the confirmation detection unit 31 confirms the arrival of the user who possesses the portable terminal 2 at the target position and cancels setting of the target position. The confirmation detection unit 31 cancels setting of the target position when the target position cancel information is output from the input information processing unit 24. When setting of the target position is cancelled, the confirmation detection unit 31 outputs image cancel information, voice cancel information, and vibration cancel information to the display image control unit 32, the voice control unit 33, and the vibration control unit 34, respectively.

The display image control unit 32 controls an image displayed on the image display unit 41. The display image control unit 32 generates target position notification image information corresponding to the target position notification information and specific target position notification image information corresponding to the specific target position notification information output from the target position notification information generation unit 28. The display image control unit 32 generates shortest path image information corresponding to the shortest path information output from the target position notification information generation unit 28. The display image control unit 32 generates approach notification image information corresponding to the approach notification information output from the reminder notification information generation unit 30. The display image control unit 32 generates notification image information corresponding to the arrival notification information output from the reminder notification information generation unit 30. The display image control unit 32 outputs the generated target position notification image information, specific target position notification image information, shortest path image information, approach notification image information, and arrival notification information to the image display unit 41. When the target position cancel information is output from the confirmation detection unit 31, the display image control unit 32 generates image cancel information for removing an image based on the target position notification image information, the specific target position notification image information, the shortest path image information, the approach notification image information, and the arrival notification information.

The display image control unit 32 outputs the generated image cancel information to the image display unit 41.

The voice control unit 33 controls the utterance to be produced from the speaker 42. The voice control unit 33 generates target position notification voice information corresponding to the target position notification information and specific target position notification voice information corresponding to the specific target position notification information output from the target position notification information generation unit 28. The voice control unit 33 generates shortest path voice information corresponding to the shortest path information output from the target position notification information generation unit 28. The voice control unit 33 generates approach notification voice information corresponding to the approach notification information output from the reminder notification information generation unit 30. The voice control unit 33 generates arrival notification voice information corresponding to the arrival notification information output from the reminder notification information generation unit 30. The voice control unit 33 outputs the generated target position notification voice information, specific target position notification voice information, shortest path voice information, approach notification voice information, and arrival notification voice information to the speaker 42. When the target position cancel information is output from the confirmation detection unit 31, the voice control unit 33 generates voice cancel information for removing a voice based on the target position notification voice information, the specific target position notification voice information, the shortest path voice information, the approach notification voice information, and the arrival notification voice information. The voice control unit 33 outputs the generated voice cancel information to the speaker 42.

The vibration control unit 34 controls a vibration of the vibrator 43. The vibration control unit 34 generates target position notification vibration information corresponding to the target position notification information and specific target position notification vibration information corresponding to the specific target position notification information output from the target position notification information generation unit 28. The vibration control unit 34 generates approach notification vibration information corresponding to the approach notification information output from the reminder notification information generation unit 30. The vibration control unit 34 generates arrival notification vibration information corresponding to the arrival notification information output from the reminder notification information generation unit 30. The vibration control unit 34 outputs the generated target position notification vibration information, specific target position notification vibration information, approach notification vibration information, and arrival notification vibration information to the speaker 42. The vibration control unit 34 generates vibration cancel information for terminating a vibration based on the target position notification vibration information, the specific target position notification vibration information, the approach notification vibration information, and the arrival notification vibration information when the target position cancel information is output from the confirmation detection unit 31. The vibration control unit 34 outputs the generated vibration cancel information to the vibrator 43.

The image display unit 41 in the notification unit 40 includes, for example, a liquid crystal display panel. The image display unit 41 displays a target position notification image corresponding to the target position notification image information output from the display image control unit 32. The image display unit 41 displays a specific target position notification image corresponding to the specific target position notification image information output from the display image control unit 32. The image display unit 41 displays an approach notification image corresponding to the approach notification image information output from the display image control unit 32.

The image display unit 41 displays an arrival notification image corresponding to the arrival notification image information output from the display image control unit 32. If the image cancel information is output when the target position notification image, the specific target position notification image, the approach notification image, and the arrival notification image are displayed, the image display unit 41 removes the displayed target position notification image, specific target position notification image, approach notification image and arrival notification image.

The target position notification image is an image showing, for example, a map or a target position on the map. On the target position notification image, the target position is displayed in a bright color so that the target position is noticeable on the map. The target position notification image may have a form in which no map is displayed or a form in which the target position is not blinking. The target position notification image may be an image having a display form in which such display forms are combined. The target position notification image may have another form.

The specific target position notification image is an image showing, for example, a map and the specific target position on the map. The specific target position notification image is displayed such that the target position is noticeable on the map, and particularly, is displayed while blinking in a large size in a bright color such that it is more noticeable than the target position notification image. The specific target position notification image may have a form in which the target position is not blinking. The specific target position notification image may be an image having a display form in which such display forms are combined, or may have another form.

The approach notification image is an image showing, for example, an approach to the target position. The approach notification image is an image showing a shortest route from a current position of the user to the specific target position. The approach notification image may be an image in which an approach at the target position is displayed in text. The approach notification image may be displayed together with the target position notification image. The approach notification image may be an image having a display form in which such display forms are combined. The approach notification image may have another form.

The arrival notification image may be an image showing, for example, arrival of the user at the target position. The arrival notification image is, for example, an image in which the target position is displayed in a large size while blinking. The arrival notification image may have another form. The arrival notification image may show, for example, a text display of "You have arrived at the target position. Please confirm your arrival."

The speaker 42 produces a target position notification sound corresponding to the target position notification voice information output from the voice control unit 33. A specific target position notification sound is, for example, an utterance for describing a route from a current location to a specific target position. The specific target position notification sound may be an utterance for describing features of the specific target position. The target position notification sound may be another utterance.

The speaker 42 produces an approach notification sound corresponding to the approach notification voice information. The approach notification sound is, for example, an utterance of the phrase "You are close to the target position." The approach notification sound may be a sound other than the utterance. The speaker 42 produces an arrival notification sound corresponding to the arrival notification voice information. The arrival notification sound is, for example, an utterance of the phrase "You have arrived at the target position. Please confirm your arrival." The arrival notification sound may be another utterance. If the image cancel information is output when the target position notification sound, the specific target position notification sound, the approach notification sound and the arrival notification sound are produced, the speaker 42 stops producing the target position notification sound, the specific target position notification sound, the approach notification sound, the arrival notification sound, which are produced.

The vibrator 43 produces a target position notification vibration corresponding to the position notification vibration information output from the vibration control unit 34. The vibrator 43 produces a specific target position notification vibration corresponding to the specific target position notification vibration information output from the vibration control unit 34. The vibrator 43 produces an approach notification vibration corresponding to the approach notification vibration information. The vibrator 43 produces an arrival notification vibration corresponding to the arrival notification vibration information. The target position notification vibration, the specific target position notification vibration, the approach notification vibration, and the arrival notification vibration may be a vibration of the same vibration pattern or a vibration of different vibration patterns. In addition, two or three of the target position notification vibration, the specific target position notification vibration, the approach notification vibration, and the arrival notification vibration may have the same vibration pattern, and the other vibrations may have a different vibration pattern. If the image cancel information is output when the approach notification vibration and the arrival notification vibration are produced, the vibrator 43 stops the vibration that is produced.

The transmitting and receiving unit 50 transmits the target position input information output from the input information processing unit 24 and the search area information output from the search area determination unit 26 to the transmitting and receiving unit 60 of the server 3 via the network 4. The transmitting and receiving unit 50 receives the POI information transmitted from the transmitting and receiving unit 60 of the server 3. The transmitting and receiving unit 50 outputs the received POI information to the target position setting unit 27.

Figure 4:
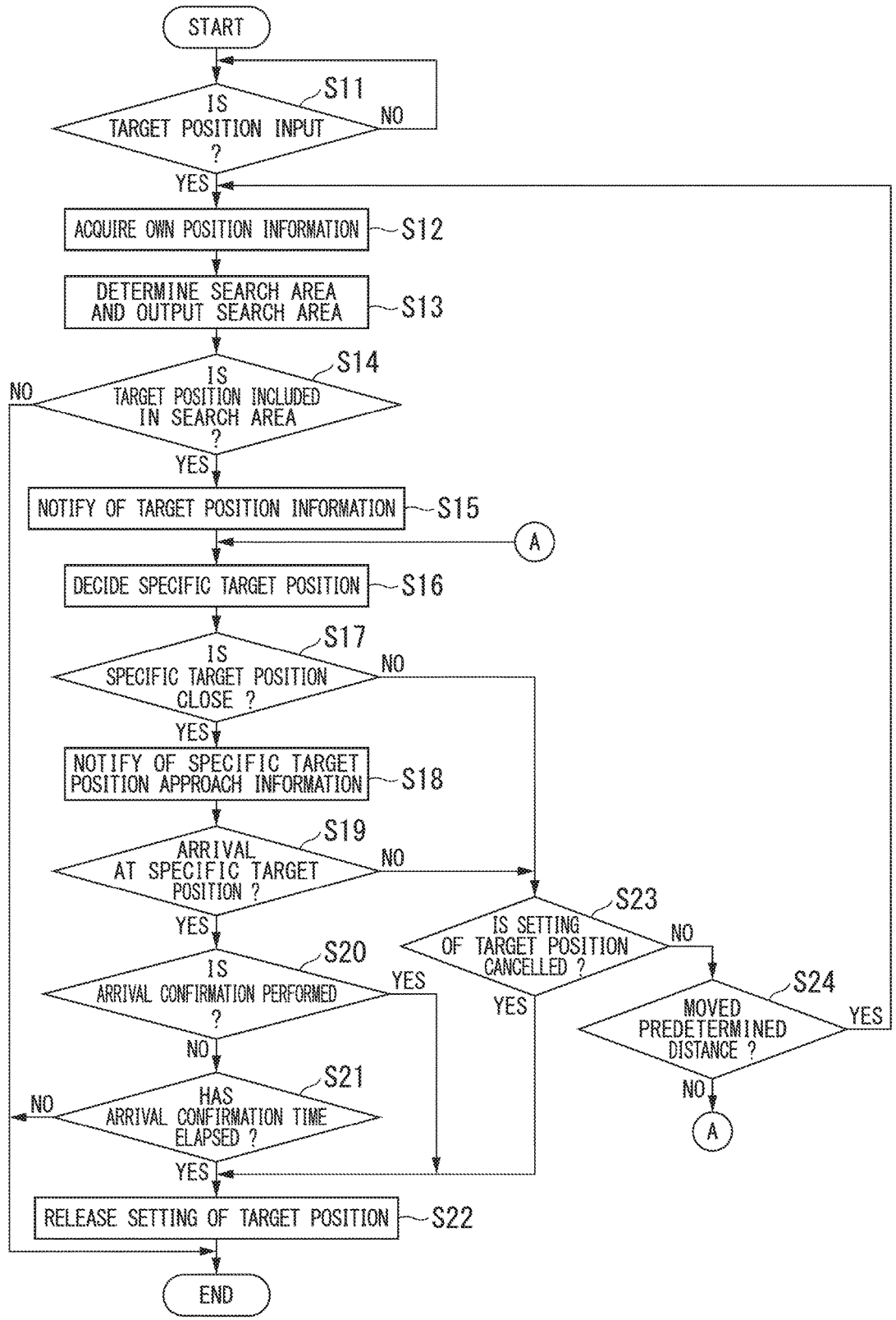
FIG. 4 is a flowchart showing processing procedures of a reminder notification system.

Next, the process in the reminder notification system according to the present embodiment will be described. FIG. 4 is a flowchart showing processing procedures of the reminder notification system according to the present embodiment.

In the reminder notification system according to the present embodiment, it is decided whether the user performs an input of the target position (Step S11). The target position input is performed by an input to the touch input unit 11 in the input unit 10 or an utterance to the sound collection unit 12. The target position input includes, for example, an input of a specific destination and an object of the user. The destination includes, for example, the convenience store A, and the drugstore A. The object of the user includes, for example, buying vegetables, and utility charge payment. The control unit 20 decides whether the target position is set according to whether the target position input information is output to the input information processing unit 24.

A method of inputting the target position will be described in further detail. When the target position is input using a voice, the user utters, for example, "buy milk at a convenience store close to ○○ Station." Then, the voice recognition unit 23 performs voice recognition of utterance content, and understands intention, and "destination: convenience store close to ○○ Station," and "task: buy milk" are recognized in the control unit 20. Then, the display image control unit 32 performs control such that "destination: convenience store close to ○○ Station," "task: buy milk" are displayed on the image display unit 41, and further a confirmation button and a cancel button, which are not shown, are displayed.

When the destination and the task are acceptable as content displayed on the image display unit 41, the user touches the confirmation button. When at least one of the destination and the task is different from desired content, the user touches the cancel button. When the confirmation button is pushed, the destination and the task are registered according to the content displayed on the image display unit 41. On the other hand, when the cancel button is touched, the voice control unit 33 encourages the user to input the destination and the task again, for example, "please utter the destination and the task once again," using a scenario prepared in advance.

A method of confirming the destination and the task is not limited to the display on the image display unit 41, but a voice may be used. In this case, referring to the previous example, the voice control unit 33 performs control such that "Would you like to set a convenience store close to ○○ Station as the destination?" is produced from the speaker 42 using a well-known voice synthesis technique, and the user utters "Yes" when the content is acceptable and utters "No" or "I wouldn't" when the content is not acceptable. The utterance is collected by the sound collection unit 12 and output to the voice recognition unit 23. When affirmative content such as "Yes" is uttered, the control unit 20 registers the destination and the task produced from the speaker previously, and when negative content such as "No" or "I wouldn't" is uttered, the voice control unit 33 encourages the user to input the destination and the task again, for example, "Please utter the destination and the task once again" using a scenario prepared in advance. The voice control unit 33 individually asks the user "Would you like to set ○○ Station as the destination?", "Would you like to set buying milk as the task?" in response to each meaning of content that is uttered from the user. Therefore, it is possible to increase overall recognition accuracy of voice recognition. Further, as the method of confirming the destination and the task, both a display method using the image display unit 41 and a confirmation method by the user using a voice (a hybrid type) may be used.

As a decision result, when the target position input is not performed (NO in Step S11), the process in Step S11 is repeated until the target position input is performed. On the other hand, when the target position input is performed (YES in Step S11), the own position determination unit 25 acquires the own position information as the own position (Step S12). The own position determination unit 25 outputs the acquired own position information to the search area determination unit 26, the target position setting unit 27, and the specific target position determination unit 29. Next, the search area determination unit 26 determines a search area on the basis of the own position information output from the own position determination unit 25 (Step S13).

The search area determination unit 26 outputs the determined search area to the transmitting and receiving unit 50 (Step S13). The transmitting and receiving unit 50 transmits the target position input information output from the input information processing unit 24 and the search area output from the search area determination unit 26 to the server 3. The server 3 creates POI information within the search area on the basis of the target position input information and the search area information transmitted from the portable terminal 2 and transmits the created information to the portable terminal 2.

The transmitting and receiving unit 50 in the portable terminal 2 receives the transmitted POI information within the search area and outputs the received information to the target position setting unit 27. Next, the target position setting unit 27 decides whether the target position is within the search area (Step S14). The decision of whether the target position is within the search area is performed according to whether the target position is included in the received POI information within the search area.

As a decision result, when it is decided that the target position is not included in the POI information within the search area and the target position is not in the search area (NO in Step S14), the target position setting unit 27 directly terminates the process in the reminder notification system. On the other hand, when it is decided that the target position is included in the POI information within the search area and the target position is in the search area (YES in Step S14), the target position setting unit 27 creates a target position list on the basis of the POI information within the search area, generates target position information based on the target position list, and outputs the result to the target position notification information generation unit 28 (Step S15). Next, the target position notification information generation unit 28 generates target position notification information on the basis of the output target position information, and outputs the generated information to the display image control unit 32, the voice control unit 33, and the vibration control unit 34.

The target position setting unit 27 decides the specific target position on the basis of the own position information and the target position information (Step S16). When there is one piece of the generated target position information, the target position setting unit 27 decides the target position as the specific target position. On the other hand, when there are a plurality of generated target positions, the target position setting unit 27 decides a target position that is closest to the own position among the plurality of target positions as the specific target position.

Then, the specific target position determination unit 29 decides whether the own position has entered the proximity area of the specific target position (Step S17). As a result, when it is decided that the own position has entered the proximity area of the specific target position (YES in Step S17), the specific target position determination unit 29 generates specific target position approach information and outputs the generated information to the reminder notification information generation unit 30 (Step S18). The reminder notification information generation unit 30 generates approach notification information on the basis of the output specific target position approach information and outputs the generated information to the display image control unit 32, the voice control unit 33, and the vibration control unit 34.

Next, the specific target position determination unit 29 decides whether the user arrives at the specific target position (Step S19). When the specific target position determination unit 29 decides that the user arrives at the specific target position (YES in Step S19), the confirmation detection unit 31 determines whether arrival confirmation was performed on the basis of the arrival confirmation information output from the input information processing unit 24 (Step S20). As a result, when it is determined that the arrival confirmation information has been output from the input information processing unit 24 and arrival confirmation has been performed by the user (there is arrival confirmation) (YES in Step S20), the confirmation detection unit 31 releases setting of the target position (Step S22), and terminates the process in the reminder notification system.

Here, a reminder notification and a confirmation method thereof will be described in further detail. For example, "destination: convenience store close to ○○ Station", and "task: buy milk" are input. When a current position of the user is close to "convenience store close to ∘∘ Station," the control unit 20 operates the vibrator 43 according to control of the vibration control unit 34, provides a notification indicating proximity to the destination to the user, "You are close to the convenience store close to ∘∘ Station. Please buy milk" is displayed on the image display unit 41 according to control of the display image control unit 32, and therefore the user is informed of the task. In addition, "You are close to the convenience store close to ∘∘ Station. Please buy milk" may be produced according to control of the voice control unit 33 together with the image display unit 41. As a method of providing the reminder to the user, both the image display unit 41 and the speaker 42 may be used, or either of the image display unit 41 and the speaker 42 may be used.

The display image control unit 32 displays a "confirmation" button (not shown) on the image display unit 41. The user executes content of the reminder. In the above example, in the case of "I bought milk," when the "confirmation" button is touched by finger manipulation, the control unit 20 can decide that the user has executed the reminder. In addition, when the user has executed the reminder, he or she utters the fact that the reminder has been executed such as "I bought milk" or "reminder execution completed," and the fact indicating the execution may be recognized by the control unit through the sound collection unit 12 and the voice recognition unit 23. As a confirmation method, both the image display unit 41 and the voice recognition unit 23 may be used, or at least one of the image display unit 41 and the voice recognition unit 23 may be used.

In addition, when it is determined that the arrival confirmation information has not been output from the input information processing unit 24 and there was no arrival confirmation (NO in Step S20), the confirmation detection unit 31 decides whether an arrival confirmation time measured by a confirmation timer has elapsed (Step S21). As a result, when it is decided that the arrival confirmation time has not elapsed (NO in Step S21), the confirmation detection unit 31 directly terminates the process in the reminder notification system. On the other hand, when it is decided that the arrival confirmation time has elapsed (YES in Step S21), setting of the target position is released (Step S22), and the process in the reminder notification system is terminated.

In Step S17, when the specific target position determination unit 29 decides that an own position is not in the proximity area of the specific target position (NO in Step S17), the confirmation detection unit 31 decides whether setting of the target position was cancelled (Step S22). In addition, in Step S19, when the specific target position determination unit 29 decides that the user has not arrived at the specific target position (NO in Step S19), the confirmation detection unit 31 decides whether setting of the target position was cancelled (Step S23). The confirmation detection unit 31 decides whether setting of the target position was cancelled according to whether cancel information has been output from the input information processing unit 24.

As a result, when it is decided that cancel information has been output from the input information processing unit 24 and setting of the target position was cancelled (YES in Step S23), the confirmation detection unit 31 releases setting of the target position (Step S22), and terminates the process in the reminder notification system. On the other hand, when it is decided that the cancel information has not been output from the input information processing unit 24 and setting of the target position was not cancelled (NO in Step S23), the specific target position determination unit 29 decides whether the user has moved a predetermined distance after the target position is input (Step S24). The predetermined distance herein is, for example, a distance at which a change is highly likely to occur in the target position included in the search range, for example, 30 m, 50 m, 200 m, 500 m, or 1 km. The predetermined distance may be another distance.

When the specific target position determination unit 29 decides that the user has moved the predetermined distance after the target position is input (YES in Step S24), the process returns to Step S12, and the own position determination unit 25 determines an own position. On the other hand, when the specific target position determination unit 29 decides that the user has not moved the predetermined distance after the target position is input (NO in Step S24), the process returns to Step S16, and the specific target position is decided. Then, after setting of the target position has been released in Step S21, the process in the reminder notification system is terminated.

Figure 5:
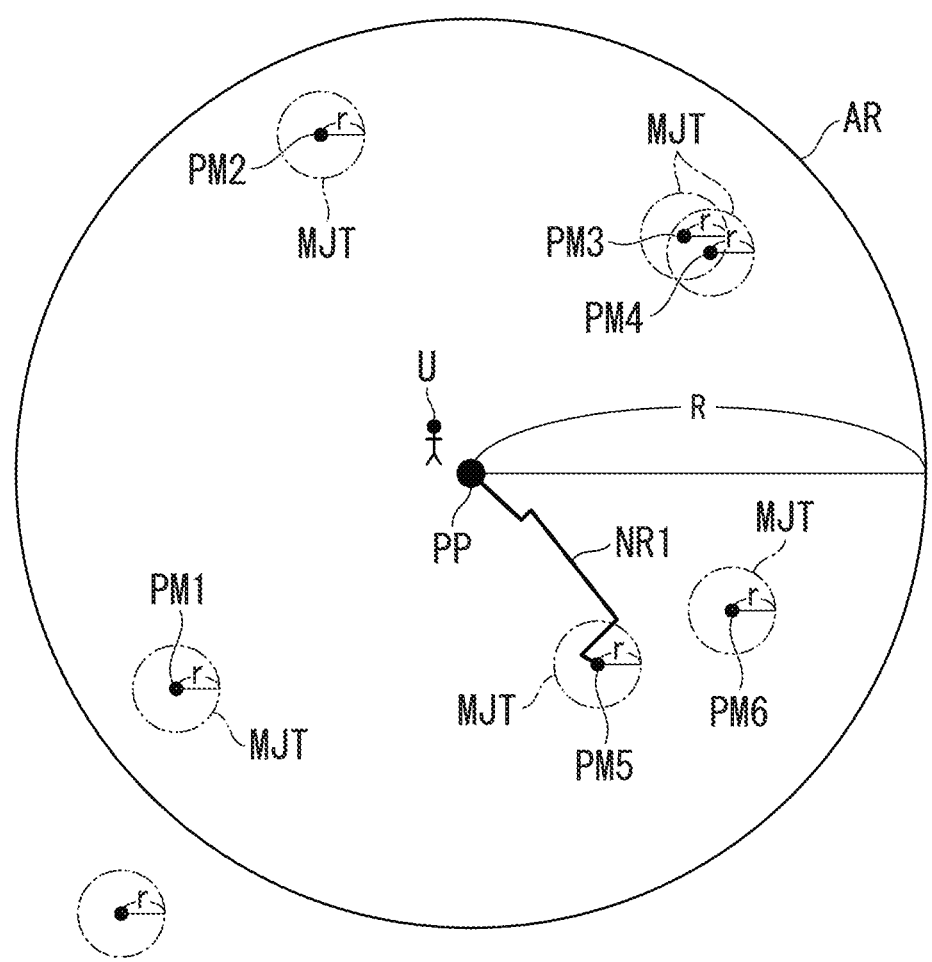
FIG. 5 is a diagram for describing a relation between a target position and an own position.

Next, a relation between the target position and the own position will be described with reference to FIG. 5. FIG. 5 is a diagram for describing the relation between the target position and the own position. When the position determined in the own position determination unit 25 is set as an own position PP of a user U, the search area determination unit 26 sets an area within a circle having a radius R using the own position PP a center as a search area AR. The target position setting unit 27 creates a target position list on the basis of the POI information within the search area, and sets target positions PM1 to PM6 within the search area AR on the basis of the target position list. All of the target positions PM1 to PM6 are target positions included in the target position list. An entry determination area MJT is set at the surroundings of each of the target positions PM1 to PM6. The entry determination area MJT is an area corresponding to the proximity area of a target position PM and is a circular range having a radius r. The radius r can have an appropriate length, for example, 10 m, 30 m, or 50 m.

The target position setting unit 27 obtains distances from the own position PP to each of the target positions PM1 to PM6 and compares the distances. Then, the target position setting unit 27 decides a target position that is closest to the own position PP as the specific target position. In the example shown in FIG. 5, the fifth target position PM5 is the specific target position.

The target position setting unit 27 calculates a shortest path from the own position PP to the specific target position PM5 on the basis of the own position PP and the target positions PM1 to PM5 on the map using the own position PP as a center. In the example shown in FIG. 5, a path NR1 connecting the own position PP and the fifth target position PM5 is the shortest path. The target position, the specific target position, and the shortest path are displayed on the image display unit 41 in the notification unit 40. In addition, profiles of the target positions and the specific target position are displayed on the image display unit 41. The profiles herein include a name of a store, a type of a store, a sale item, business hours, and a distance to a store. Such profiles are also uttered from the speaker 42.

When notified of the target positions and the specific target position, the user U can decide the target position of the destination with reference to such notification. The target position of the destination may be the specific target position, or may be a target position other than the specific target position. When the user U starts to move to the target position of the destination and moves the predetermined distance, the reminder notification system 1 perform setting of the target position again until setting of the target position is cancelled.

Figure 6:
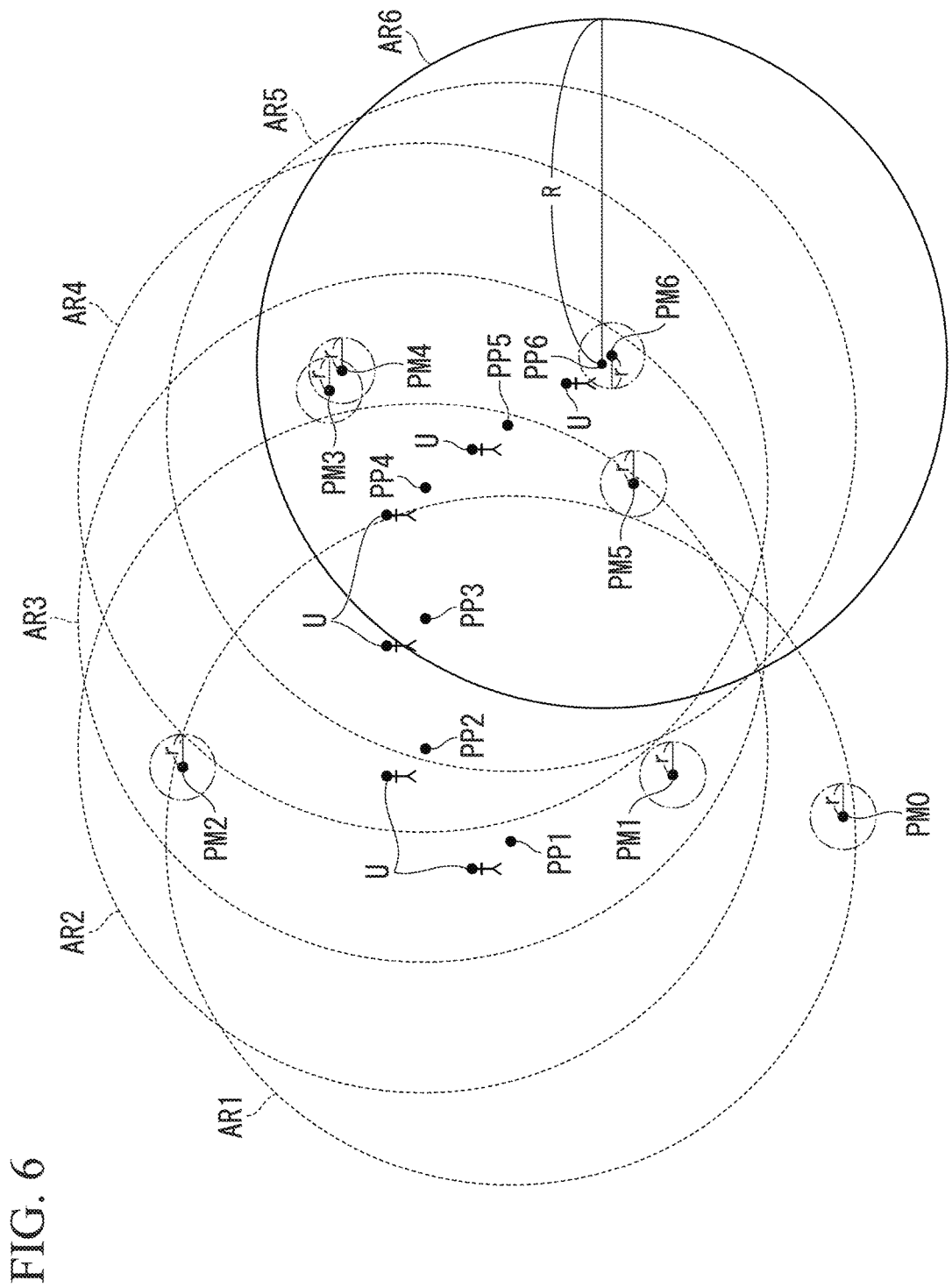
FIG. 6 is a diagram for describing a variation of a search area, a target position, and a specific target position according to a movement of a user.

In addition, when the user moves the predetermined distance, for example, moves 50 m, setting of the target position is performed again. Therefore, when the user moves, the target position and the specific target position are changed and updated at any time. A variation of the target position and the specific target position will be described. FIG. 6 is a diagram for describing a variation of the search area, the target position, and the specific target position according to a movement of the user U.

In the example shown in FIG. 6, the user U sequentially moves from a first own position PP1 to a sixth own position PP6. Here, according to a movement of the user U, the search area is also moved from a first search area AR1 to a sixth search area AR6. When the search area is moved, the target position within the search area is varied. The target position setting unit 27 updates the target position list at any time according to the own position PP of the user U and a movement of the search area AR. FIG. 5 shows a state in which the user in FIG. 6 is positioned at the third own position PP3. The target positions PM1 to PM6 in FIG. 6 indicate target positions shown in FIG. 5. In addition, since a 0th target position PM0 is a target position that is not included in the third search area AR3, it is a target position, which is not shown in FIG. 5.

As shown in FIG. 6, when the user U is positioned at the first own position PP1, three target positions, the 0th target position PM0 to the second target position PM2, are included in the first search area AR1. In this state, among the 0th target position PM0 to the second target position PM2, the first target position PM1 is a target position that is closest to the own position PP1. Therefore, the first target position PM1 serves as the specific target position.

In this case, the notification unit 40 notifies of the fact that the first target position PM1 is set as the specific target position. However, the user U is assumed not to move in a direction of the first target position PM1, but move to the second own position PP2. In this state, the 0th target position PM0 is outside of the second search area AR2, and two target positions, the first target position PM1 and the second target position PM2, are included in the second search area AR2. In addition, the second own position PP2 is closer to the second target position PM2 than the first target position PM1, and the second target position PM2 serves as the specific target position.

Further, the user U is assumed not to move in a direction of the second target position PM2, but move to the third own position PP3. In this state, six target positions, the first target position PM1 to the sixth target position PM6, are included in the third search area AR3. In addition, the third own position PP3 is closer to the fifth target position PM5 than the second target position PM2, and the fifth target position PM5 serves as the specific target position.

In this manner, the search area AR is varied according to the movement of the user, and the specific target position is also changed. Therefore, the same process is repeated before arriving at the specific target position finally. In the example shown in FIG. 6, finally, the sixth target position PM6 is set as the specific target position, and the user U arrives at the sixth target position PM6. During this time, the search area AR, and the target position PM and the specific target position included in the search area AR have been varied. When the user U moves in a direction of the specific target position, the specific target position is not usually changed. In this case, the search area AR is varied, and the target position PM included in the search area AR is varied.

Figure 7:
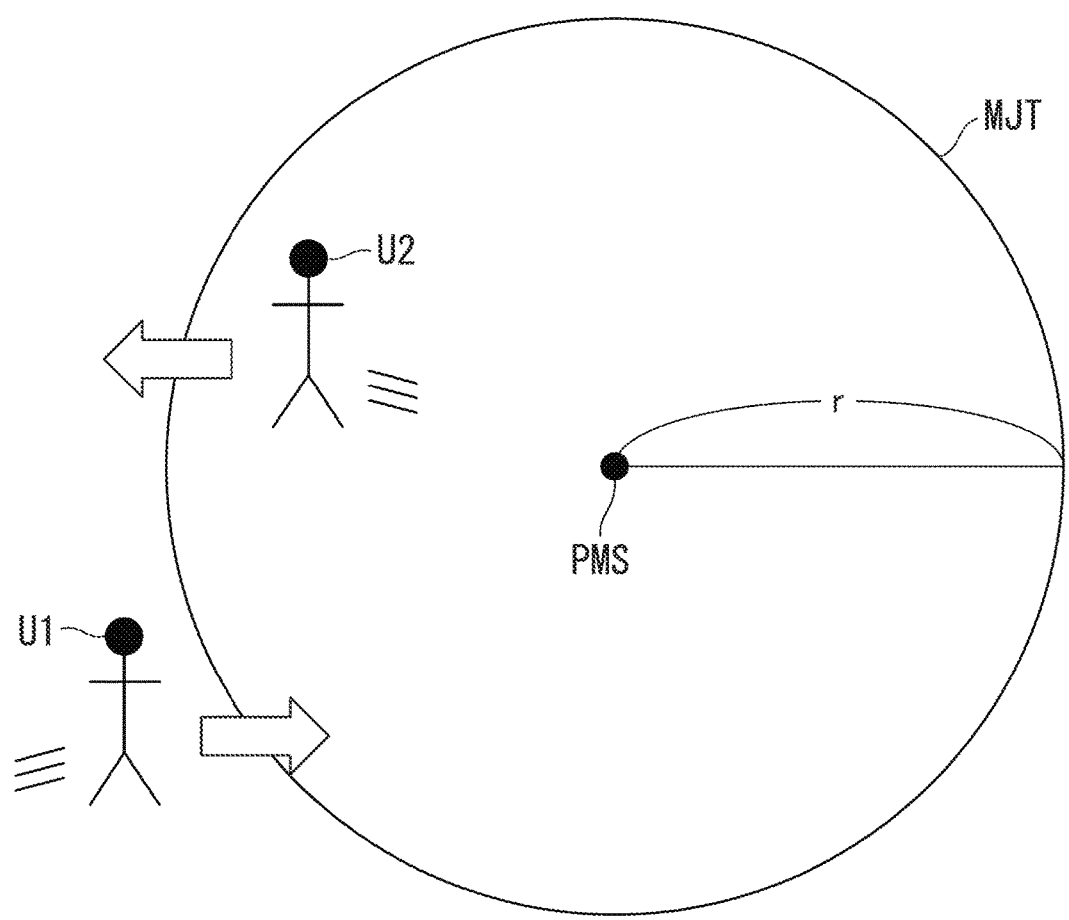
FIG. 7 is a diagram for describing a state in which a user arrives at the vicinity of a specific target position.

Next, a case in which the user arrives at the target position will be described. FIG. 7 is a diagram for describing a state in which the user arrives at the vicinity of the specific target position. When the user U1 enters the entry determination area MJT, the specific target position determination unit 29 determines that the user arrives at the vicinity of the target position. Further, the specific target position determination unit 29 determines that the user arrives at the target position when the own position of the user matches the specific target position. The specific target position determination unit 29 determines entry of the user U into the entry determination area MJT and provides the reminder. Furthermore, like the user U2, when the user exits the specific target position, the reminder can be provided. For example, "You are exiting the target position" can be used as the reminder in this case.

In this manner, in the reminder notification system 1 according to the present embodiment, a plurality of target positions associated with predetermined categories are set, and when the user arrives at at least one proximity area from the plurality of target positions, the reminder is provided. Therefore, when the user only inputs a related item of the predetermined category, it is possible to set the plurality of target positions. For example, as the related item of the predetermined category, the fact indicating the user wishes to buy vegetables is input. In this case, the reminder notification system acquires POI information of a store in which vegetables are sold, creates a target position list, and displays the target position included in the target position list on the image display unit 41 along with a neighboring map. Therefore, since there is no need to individually register information of the vegetable store, it is possible to reduce the time and effort necessary for registering the target position.

In addition, in the reminder notification system 1, the search area determination unit 26 limits a range in which the target position associated with the category is searched for to a predetermined range. Therefore, since the number of target positions to be searched for can be limited to a small number, it is possible to contribute to the reduction of an amount of computation while the target position is searched for in a range close to the position of the user.

In addition, when there is a plurality of target positions, the reminder notification system 1 calculates the target position that is closest to the user, and generates specific target position information. By displaying the specific target position on the image display unit 41, it is possible to provide the target position at which the user most easily arrives. Furthermore, since a shortest path to the specific target position is also displayed, the user can easily arrive at the target position at which the user arrives most easily.

Further, in the reminder notification system 1, when the user arrives at the target position, it is possible to confirm the arrival. Therefore, since the arrival of the user at the target position can be confirmed, it is possible to reliably terminate the process when the reminder is unnecessary. In addition, when setting of the target position is cancelled, the process is terminated. Accordingly, when the reminder is unnecessary, it is possible to more reliably terminate the process.

In addition, the input unit 10 includes the sound collection unit 12 in addition to the touch input unit 11. Accordingly, the user can easily input information about the target position, information about arrival at the target position, and information about cancelling the target position.

In the above embodiment, the portable terminal 2 has a configuration that includes the map information DB 22, the target position setting unit 27, the own position determination unit 25, the search area determination unit 26, the target position setting unit 27, the target position notification information generation unit 28, the specific target position determination unit 29, and the reminder notification information generation unit 30.

Instead of such a configuration, the server 3 may include some or all of the components. In this case, the server 3 may synchronously acquire own position information of the portable terminal 2, generate reminder notification information, and transmit the result to the portable terminal 2.

In addition, while a configuration using the portable terminal such as a smart phone is exemplified in the above embodiment, the configuration may be applied to a navigation device of a vehicle. In a navigation device having a hands-free function through which a destination and the like can be input by a voice, the user utters the destination and the task such as "buy a battery at a home center in ○○ city" and registers the destination and the task in the navigation device. A method of designating the destination and the task by voice recognition may use the same content as those described in the above embodiment. When the vehicle is close to "home center in ○○ city" while running, the navigation device produces an utterance such as "You are close to a home center called ΔΔ. Would you like to go there?" When the user produces an affirmative utterance such as "Yes," "So, a path to the ΔΔ home center is searched for" is produced, the path to the home center is searched for, and navigation is provided for the user. Then, when the user arrives at the destination, the navigation device provides a notification to the user by producing the task such as "Please buy the battery," and the user can perform the desired task.

On the other hand, when the navigation device produces "You are close to a home center called ΔΔ. Would you like to go there?", if the user utters "No" or "I don't want to go there," the navigation device may provide an alternative by producing the following "Would you like to go to □□ home center in an adjacent city?" in the middle of the path. In addition, the navigation device may produce "Would you like to cancel the task?" and encourage the user to cancel the task.

Indeed, such operations are not limited to setting of the task by voice recognition, but the destination and the task may be set by finger manipulation using an image display unit (a touch panel) included in the navigation device. An input method using the image display unit may be performed by finger manipulation or may be performed using a manipulation unit such as a joystick.

In addition, a reminder notification may be performed such that a program for implementing functions of the reminder notification system in the present invention is recorded in a non-transitory computer readable recording medium, and a computer system reads and executes the program recorded in the recording medium. The term "computer system" used herein includes an OS or hardware such as peripheral devices. In addition, the "computer system" also includes a WWW system having a homepage providing environment (or a display environment). Moreover, the "computer readable recording media" include portable media such as a flexible disk, a magneto-optical disc, a ROM, and a CD-ROM, and a storage device built in the computer system such as a hard disk.

Further, the "computer readable recording media" include media that maintain a program for a predetermined time like a volatile memory (RAM) in the computer system serving as a server or a client when the program is transmitted through a network such as the Internet or a communication line such as a telephone line.

In addition, the program may be transmitted from the computer system in which the program is stored in, for example, the storage device, to another computer system through transmission media or a transmission wave in the transmission media. Here, the term "transmission media" for transmitting the program refers to media that have a function of transmitting the information like a network (a communication network) such as the Internet or a communication line (a communication wire) such as a telephone line. In addition, the program may also include a program for implementing a part of the above-described functionality and include a differential file (a differential program) in which the above-described functionality is implemented in combination with a program that has already been recorded in the computer system.

While the embodiments of the invention have been described above in detail with reference to the drawings, specific configurations are not limited to the above-described embodiments and various design modifications within the scope without departing from the scope and spirit of the invention can be made.

What is claimed is:

1. A reminder notification system comprising:
a processor, wherein the processor is configured to function as:
a position acquisition unit configured to acquire a position of a user;
a target position setting unit configured to set a target position set, the target position set comprising at least one target position;
a reminder notification unit configured to provide a reminder about a proximity area within a predetermined distance from a target position of the target position set when the position of the user is in the proximity area;
a search unit configured to search for target positions to be included in the target position set within a predetermined search range; and
a target position information notification unit configured to notify of target position information about the target positions included in the target position set within the search range found in the search unit,
wherein the target position setting unit sets the target position set associated with a predetermined category,
wherein the reminder notification unit provides the reminder when the position of the user arrives at at least one proximity area of the target position set belonging to the predetermined category, and
wherein the search unit updates a list of the target positions included in the target position set and belonging to the predetermined category, according to a movement of the position acquisition unit, wherein the target positions that belong to the predetermined category and located within the search range of a new position of the user acquired by the position acquisition unit following movement of the position acquisition unit are added to the target position list when the target position list is updated, and target positions that are not located within the search range of a new position of the user acquired by the position acquisition unit following movement of the position acquisition unit are removed from the target position list when the target position list is updated.

2. The reminder notification system according to claim 1, wherein the processor is further configured to function as
a calculation unit configured to calculate a most quick-arrival target position which is a target position at which the user most quickly arrives when the target position set includes more than one target position found within the search range, wherein the target position information notification unit notifies of most quick-arrival target position information about the most quick-arrival target position.

3. The reminder notification system according to claim 1, wherein the processor is further configured to function as a confirmation detection unit configured to detect confirmation of notification of the reminder by the user.

4. The reminder notification system according to claim 1, wherein the processor is further configured to function as a sound collection unit configured to record an acoustic signal; and a voice recognition unit configured to recognize the acoustic signal collected by the sound collection unit, wherein the target position setting unit sets the target position set on the basis of the acoustic signal recognized by the voice recognition unit.

5. The reminder notification system according to claim 3, wherein the processor is further configured to function as:

a sound collection unit configured to record an acoustic signal; and a voice recognition unit configured to recognize the acoustic signal collected by the sound collection unit, wherein the confirmation detection unit detects confirmation of notification of the reminder on the basis of the acoustic signal recognized by the voice recognition unit.

6. A reminder notification method comprising:

a position acquisition procedure of acquiring a position of a user;

a target position setting procedure of setting a target position set comprising at least one target position;

a reminder notification procedure of providing a reminder about a proximity area within a predetermined distance from a target position of the target position set when the position of the user is in the proximity area;

a search procedure of searching for target positions to be included in the target position set within a predetermined search range;

a target position information notification procedure of notifying of target position information about target positions included in the target position set within the search range found in the search procedure, wherein the target position set associated with a predetermined category is set in the target position setting procedure, wherein the reminder is provided when the position of the user arrives at at least one proximity area of the target position set belonging to the predetermined category in the reminder notification procedure, and wherein a list of target positions included in the target position set, that is a list of target positions belonging to the predetermined category, according to a movement of the user acquired in the position acquisition procedure, is updated wherein the target positions that belong to the predetermined category and located within the search range of a new position of the user acquired by the position acquisition unit following movement of the position acquisition unit are added to the target position list when the target position list is updated, and target positions that are not located within the search range of a new position of the user acquired by the position acquisition unit following movement of the position acquisition unit are removed from the target position list when the target position list is updated.

* * * * *